United States Patent [19]
Beckmann et al.

[11] 3,890,789
[45] June 24, 1975

[54] THERMAL POWER PLANTS

[75] Inventors: Georg Beckmann; Paul Viktor Gilli, both of Vienna, Austria

[73] Assignee: Waagner-Biro Aktiengesellschaft, Austria

[22] Filed: Dec. 6, 1973

[21] Appl. No.: 422,413

[30] Foreign Application Priority Data
Dec. 7, 1972  Austria .............. 10474/72

[52] U.S. Cl. .................... 60/659; 122/35
[51] Int. Cl. .................... F01k 3/12; F01k 1/14
[58] Field of Search .............. 122/35; 60/659

[56] References Cited
UNITED STATES PATENTS

| | | | |
|---|---|---|---|
| 2,207,035 | 7/1940 | Gilli | 60/94 A |
| 2,320,586 | 6/1943 | Gilli | 60/94 A |
| 3,626,907 | 12/1971 | Slattery | 122/35 |

*Primary Examiner*—Edgar W. Geoghegan
*Assistant Examiner*—Allen M. Ostrager
*Attorney, Agent, or Firm*—Steinberg & Blake

[57] ABSTRACT

A thermal power plant such as a nuclear power plant where a primary circuit is provided for generating primary power while an accumulator circuit communicates with the primary circuit for generating additional power to be utilized for peak loads. The accumulator circuit includes displacement accumulators communicating with steam-generating units for providing the energy to be utilized for the additional peak power. Fluid is circulated between the displacement accumulators and steam generator units by way of a circulating conduit system and a fluid-circulating structure communicating therewith. This fluid-circulating structure is driven from a drive accumulator, so that it is not necessary to use electricity in order to circulate the fluid of the accumulator circuit.

14 Claims, 5 Drawing Figures

3,890,789

3,890,789

THERMAL POWER PLANTS

BACKGROUND OF THE INVENTION

The present invention relates to thermal power plants and particularly to nuclear power plants having at least one primary and at least one accumulator circuit provided with a displacement type of hot water accumulator in order to take care of peak loads.

Thermal power plants with displacement type of hot water accumulators are already known. However, in order to circulate the fluid electrically driven centrifugal pumps are conventionally utilized. Such pumps are extremely expensive and require an undesirably large amount of electrical energy precisely at the time when peak load requirements occur, calling for the greatest amount of power in the mains.

SUMMARY OF THE INVENTION

It is accordingly a primary object of the present invention to provide a power plant which will avoid these drawbacks.

In particular, it is an object of the present invention to provide a thermal power plant, such as a nuclear power plant, where the circulation of the fluid in the accumulator circuit does not require electrically driven pumps.

Thus it is an object of the present invention to provide for a thermal power plant an accumulator circuit for achieving additional peak power with this accumulator circuit including accumulators which reserve energy not only for generation of steam but also which reserve energy for driving the fluid through the accumulator circuit.

A further object of the present invention is to provide an accumulator circuit of the above type which operates in a manner which is far more efficient than has heretofore been the case, so that a greater power output can be achieved from the energy which is reserved in the accumulator circuit to be utilized during peak loads.

According to the invention, the accumulator circuit includes a displacement accumulator means and a steam generator means communicating with each other through a circulating conduit means to which a circulating means is operatively connected for circulating through the latter conduit means the fluid which travels between the displacement accumulator means and the steam generator means. A hot water accumulator, particularly a high pressure hot water accumulator, serves as a drive accumulator means which is operatively connected with the circulating means for driving the latter. This circulating means can take the form of a jet type of circulating structure such as an ejector, or a turbine-pump unit may be used for this purpose. Furthermore it is possible in accordance with additional features of the invention to incorporate into the discharge conduit from the drive accumulator means to the circulating means one or more superheaters for superheating the steam generated by the steam generators with the fluid derived from the displacement accumulator means. The superheaters operatively connected with the latter discharge conduit of the drive accumulator means may include primary superheaters for superheating the primary steam as well as intermediate superheaters for superheating the intermediate steam, the primary and intermediate steam being respectively delivered to primary and secondary stages of a turbine utilized during peak power generation.

Thus, in accordance with the present invention the pressure energy which is stored in the drive accumulator means is utilized to pressurize the circulating fluid of the displacement accumulator system, particularly by means of a jet type of circulating means, so that in this way the fluids from both accumulator systems mix together and the thermal energy of the drive accumulator means is at least partially delivered to the displacement accumulator means as part of the reserve stored therein. Thus, the drive accumulator means has a charging pressure which is approximately 2–5 times as great as that of the displacement accumulator means. On the other hand, the volume of the drive accumulator means is substantially smaller than that of the displacement accumulator means and may be on the order of 1/5–1/20 thereof.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
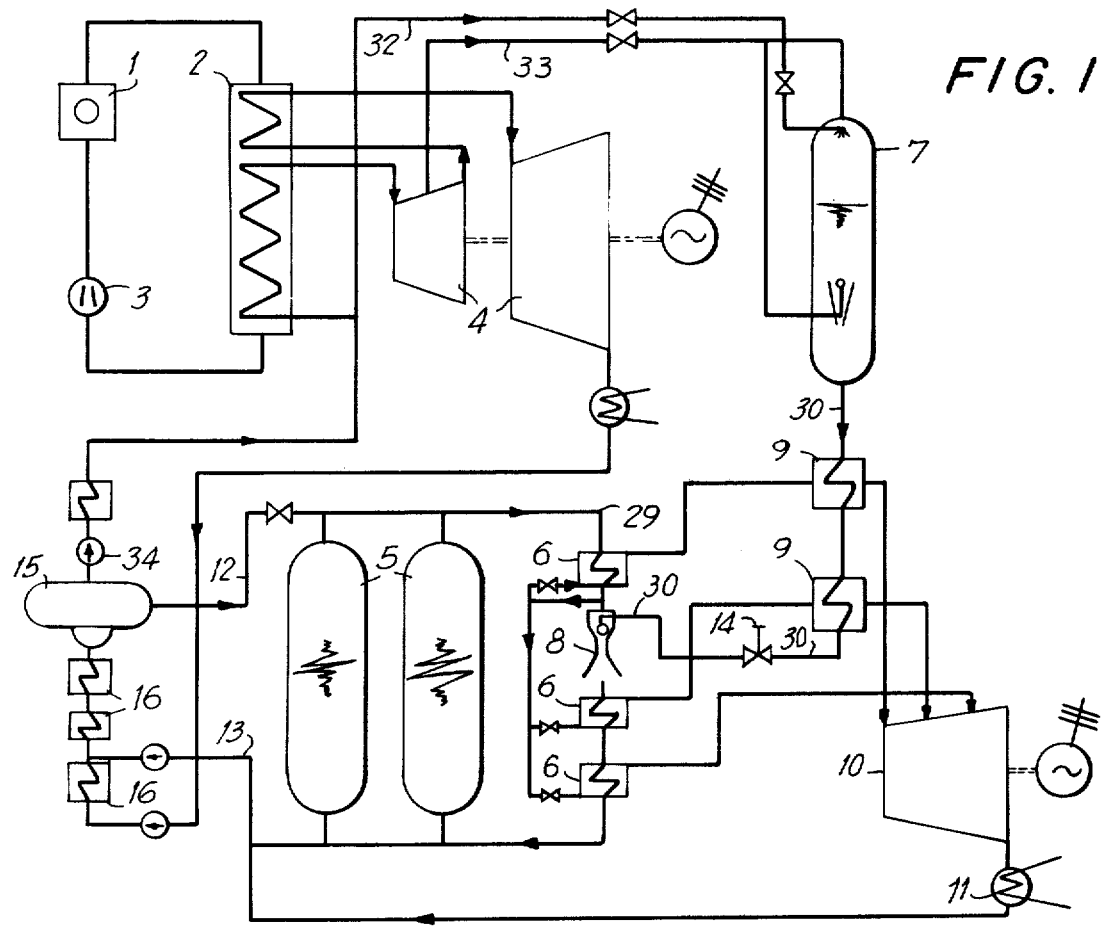
FIG. 1 is a schematic illustration of one embodiment of a nuclear power plant according to the invention.

In the schematic illustration of FIG. 1 there is shown a nuclear power plant having an accumulator circuit and a separate turbine for peak loads. In the accumulator circuit heat exchangers are used as steam generators and an ejector 8 is used as a circulating means for circulating the fluid. At the left half of FIG. 1 is shown the primary circuit means utilized for generating primary power and including a high-temperature reactor. A cooling fluid is used to cool the reactor, and upon leaving the reactor 1, this cooling fluid which is in a heated state flows through a primary steam generator 2 where heat is taken from the cooling fluid which is then returned by a blower 3 to the reactor 1. The steam generator 2 generates high-pressure steam which is expanded in the high-pressure stage of the primary turbine 4. The steam which discharges from the high-pressure stage of the turbine 4 then returns to the steam generator 2 to be heated at an intermediate superheater thereof before being delivered to the low-pressure stage of the primary turbine 4. In this low-pressure stage the steam expands to the condenser pressure. Thus FIG. 1 shows the high-pressure stage of the turbine 4 at the left and the low-pressure stage at the right, these stages being connected to the schematically illustrated generator while the condenser is shown just below the lower right end of the low-pressure stage of the turbine 4 in FIG. 1. The intermediate superheater of the generator 2 is shown in the upper portion of the generator 2 receiving the fluid which discharges from the high-pressure stage of the turbine 4 and delivering this fluid to the low-pressure stage of the turbine.

The fluid which is cooled in the condenser flows from the latter to a feedwater preheating means 16, formed by a plurality of heat exchangers connected in series and receiving heat from a source such as intermediate stages of the turbine 4. From the feedwater preheating means 16 the fluid flows into the feedwater tank 15 from which the fluid is supplied to the steam generator 2, as by a suitable pump 34. However, a supply conduit 32 branches from the feedwater supply to the steam generator 2, and this conduit 32 delivers part of the fluid from the feedwater tank 15 into a drive accumulator means 7 described in further detail below so that in this way the water requirements of the drive accumulator means 7 are met. High-pressure steam is taken from an intermediate stage in the high pressure section of the turbine 4 and delivered through a conduit 33 into the drive accumulator means 7 so that through this conduit 33 the drive accumulator means 7 is charged with high-pressure steam.

The right half of the schematic illustration in FIG. 1 shows the accumulator circuit means. This accumulator circuit means in the illustrated example is shown as including two displacement accumulators 5, a plurality of series-connected steam generators 6, the drive accumulator 7, the ejector 8, the superheaters 9, the separate peak-load turbine 10, as well as the condenser 11 of the peak-load turbine 10. Thus, the accumulators 5 form a displacement accumulator means. The charging of the displacement accumulator means is brought about by way of a charging conduit 12 communicating with the feedwater tank 15. The return of condensate, particularly excess condensate, takes place by way of the return supply conduit 13 through a part of the series-connected feedwater preheating units 16 before reaching the feedwater tank 15.

The charging of the displacement accumulator means 5 and the drive accumulator means 7 takes place during non-peak load periods, so that these accumulator means will have stored therein a reserve of energy to be utilized during peak-load periods. In order to place the accumulator circuit means in an energy-discharging mode to provide additional peak-load power, the valve 14 is opened. This valve 14 is connected to a discharge conduit 30 for discharging the drive accumulator means 7. The opening of the valve 14 will provide the supply of a driving medium to the circulating means 8. The illustrated circulating means 8 is in the form of a jet device such as an ejector which is thus supplied with a jet of hot water which serves as the driving medium. This circulating means 8 is operatively connected with a circulating conduit means which includes the discharge conduit 29 for the displacement accumulator means 5 and which provides for the circulation of fluid by the circulating means 8 between the displacement accumulator means 5 and the plurality of series-connected steam generator units 6 which form the steam generator means for the accumulator circuit means. Thus, the operation of the ejector 8 will start circulation of the pressurized fluid from the displacement accumulator means 5 through the series of steam generator units 6 which in the illustrated example are shown as including three heat exchangers situated in series one after the other. Thus, the first steam generator unit 6 communicates directly with the discharge conduit 29 while the ejector 8 is shown connected between the first and second steam generator units 6. In addition, just upstream of the ejector 8, but downstream of the first steam generator unit 6, part of the circulating fluid is delivered to a branch from which the circulating fluid is delivered in the form of subsidiary streams through three throttle valves to the several steam generator units 6, so that part of the water circulated from the displacement accumulator means 5 is utilized as feedwater for the several steam generators 6. From this feedwater which is delivered in this way to the several steam generators 6, steam is provided for delivery to the turbine 10. In order to maintain the moisture content of the discharge of the peak power turbine 10 as low as possible, the high and intermediate pressure steam delivered to the turbine 10 is first superheated by way of a pair of superheaters 9 which derive heat from the driving medium of the drive accumulator means 7. Thus it will be seen that the first and second heat exchangers which form the first and second steam generators 6 deliver their output respectively to the first and second superheaters 9 which are connected one after the other along the discharge conduit 30 leading from the drive accumulator means 7, so that in this way the steam which reaches the high and intermediate pressure stages of the turbine 10 is first superheated. The use of these superheaters 9 will, furthermore, serve to cool the driving fluid flowing along the discharge conduit 30 to the circulating means 8, so that there will be no or very little cavitation phenomena occurring at the ejector 8.

The charging of the displacement accumulator means 5 takes place by way of discharge of hot water from the feedwater tank 15, as pointed out above, this charging being delivered to the upper ends of the accumulators 5 by way of the conduit 12. The displaced cooler water is displaced by the charging into the top ends of the accumulators 5 out of the lower ends thereof to be delivered through the conduit 13 to the series of feedwater heater units 16. During the charging an increased amount of steam must be taken from the primary turbine 4. For this purpose suitable heat exchangers can be used or the heat exchangers formed by the feedwater heating units 16 can be utilized for this purpose.

As was pointed out above, the charging of the drive accumulator means 7 takes place with high-pressure feedwater, by way of the feedwater pump 34 of the steam generator 2 through the branch conduit 32, while the required thermal energy is provided by bleeding off steam from the high-pressure stage of the primary turbine 4 through the conduit 33.

The drive accumulator means 7 differs from the displacement accumulator means 5 primarily in that the upper part of the drive accumulator means 7 has a steam cushion while the discharge conduit for the drive accumulator means 7 is connected to the lower end thereof.

Figure 2:
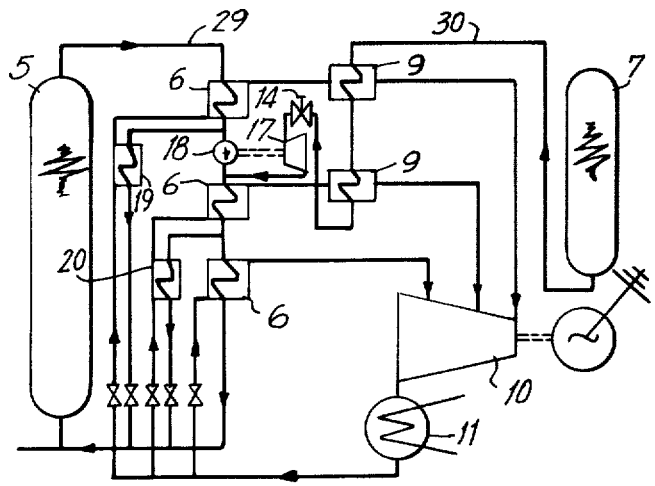
FIG. 2 is a fragmentary illustration of another embodiment of a nuclear power plant, at the accumulator circuit thereof.

FIG. 2 illustrates a variation of the accumulator circuit means of FIG. 1. In the embodiment of FIG. 2 the driving medium from the drive accumulator means 7 is not delivered to a jet apparatus, but instead the pressure energy is utilized in a turbine 17 the power of which is then given up to a circulating pump 18 for driving the latter. This in the case of FIG. 2 the circulating means takes the form of a turbine-pump unit 17, 18. With this embodiment it is possible by slight changes to achieve a complete separation between the accumulator fluid of the drive accumulator means and the operating fluid for the peak-load turbine 10. However in the particular example illustrated the partially expanded medium from the turbine 17 is delivered to the fluid which is circulated by the pump 18 through the circulating conduit means which includes the conduit 29 through which the displacement accumulator means 5 discharges as well as the heat exchangers 6 situated downstream of the pump 18 and communicating with the accumulator means 5.

In order to reduce the heating surface area of the series of steam generators 6, separate heating surface areas are provided for preheating and for evaporating the operating medium of the peak-load turbine 10. Thus it will be seen that the primary heating fluid from which heat is extracted is delivered in series sequentially through the steam generator 6. On the other hand, the preheaters 19 and 20 which preferably have different operating pressures have heat supplied thereto from part of the medium of the displacement accumulator means 5. The preheaters 19 and 20 as well as the low-pressure steam generator of the series of generators 6 are respectively placed in communication with the condensate delivery conduit of the turbine 10 through suitable throttle valves.

Except for the differences set forth above, the accumulator circuit means of FIG. 2 is the same as that of FIG. 1.

Figure 3:
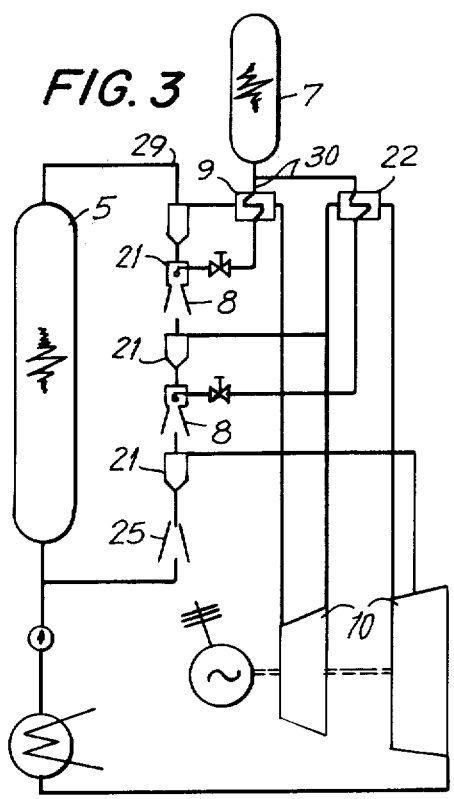
FIG. 3 shows a further embodiment of the accumulator circuit.

FIG. 3 illustrates a further embodiment of an accumulator circuit means of the invention. In FIG. 3 the generation of steam takes place in stages by successive flash and phase-separation steps for the accumulator fluid, these treatments being carried out in a plurality of flash steam generating units 21 which are connected in series, with the pressure drop being compensated by use of a diffusor 25 as well as one or more jet units such as ejectors. Thus it will be seen from FIG. 3 that the circulating means for circulating the fluid of the displacement accumulator means 5 takes the form of a pair of ejectors 8 situated between the three successive flash steam generators 21 with the last of the series of flash steam generators 21 communicating through a diffusor 25 with the return flow conduit for the fluid of the displacement accumulator means 5. In this case the fluid of the drive accumulator means 7 is utilized for superheating the high pressure steam from the displacement accumulator means 5 with a superheater 9 while the intermediate pressure steam used at an intermediate stage of the turbine 10 is superheated by way of an intermediate superheater 22. Referring to FIG. 3 it will be seen that the discharge conduit 30 communicating with the drive accumulator means 7 has a pair of branches directed through the superheaters 9 and 22, the superheater 9 receiving steam from the first flash steam generating unit 21 in order to superheat the latter steam before it reaches the high-pressure stage of the turbine 10, while the superheater 22 receives intermediate pressure steam from the intermediate flash steam generator 21 to superheat the latter steam before it is delivered to the intermediate stage of the turbine 10. It will be noted that this intermediate pressure steam is combined with the steam which expands in the high-pressure stage of the turbine 10, this latter steam being delivered to the turbine 10 from the superheater 9. Thus, before the fluid discharging from the drive accumulator means 7 reaches the pair of ejectors 8, this fluid first has heat extracted therefrom at the superheaters 9 and 22. The ejector 8 which receives fluid cooled in the superheater 9 is situated between the first and second generators 21 while the ejector 8 which receives fluid cooled in the superheater 22 is situated between the second and third generators 21.

Figure 4:
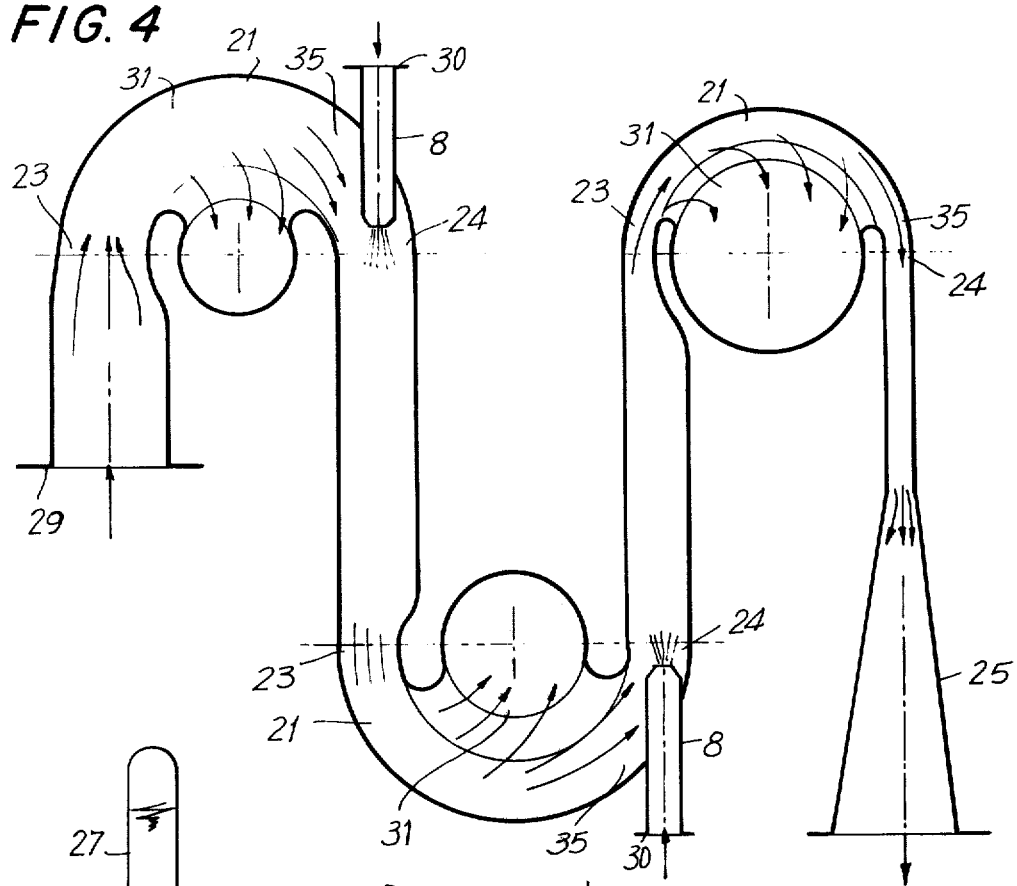
FIG. 4 is a schematic illustration of a multistage flash steam generator system as utilized in the embodiment of FIG. 3.

FIG. 4 illustrates in greater detail the multistage flash steam generators 21 and ejectors 8 which are illustrated schematically in FIG. 3. Referring to FIG. 4, the working fluid derived from the displacement accumulator means 5 through the discharge conduit 29 is delivered to a converging conduit portion 23 which is tapered as illustrated at the left portion of FIG. 4 so as to have a continuously diminishing diameter, so that in this way the fluid is accelerated causing a drop in the pressure of the fluid and generation of steam. The kinetic energy which is created in this way is utilized in the next-following phase-separator means 31 to separate the steam by centrifugal force. The remaining water is received in the next-following chamber 35 and the speed of flow thereof may be increased by way of the driving jet of the ejector 8 as illustrated, although the use of the ejector 8 at this stage may not be required in all cases, the ejector 8 receiving its jet from the discharge conduit 30 of the driving accumulator means 7. The resulting fluid from this first stage is then delivered to the next stage where a second converging conduit portion 23 serves to accelerate the fluid to repeat the phase separation with the liquid from the intermediate flash steam generator 21 also having its speed increased by the second ejector 8. Subsequent to the last or third stage where the above operations are repeated with the structure shown at the upper right portion of FIG. 4, the separated liquid phase 24 is received by the diffusor 25 which serves to convert the kinetic energy resulting from the converging tubular portions 23 and the ejectors 8 as much as possible back into pressure energy.

Figure 5:
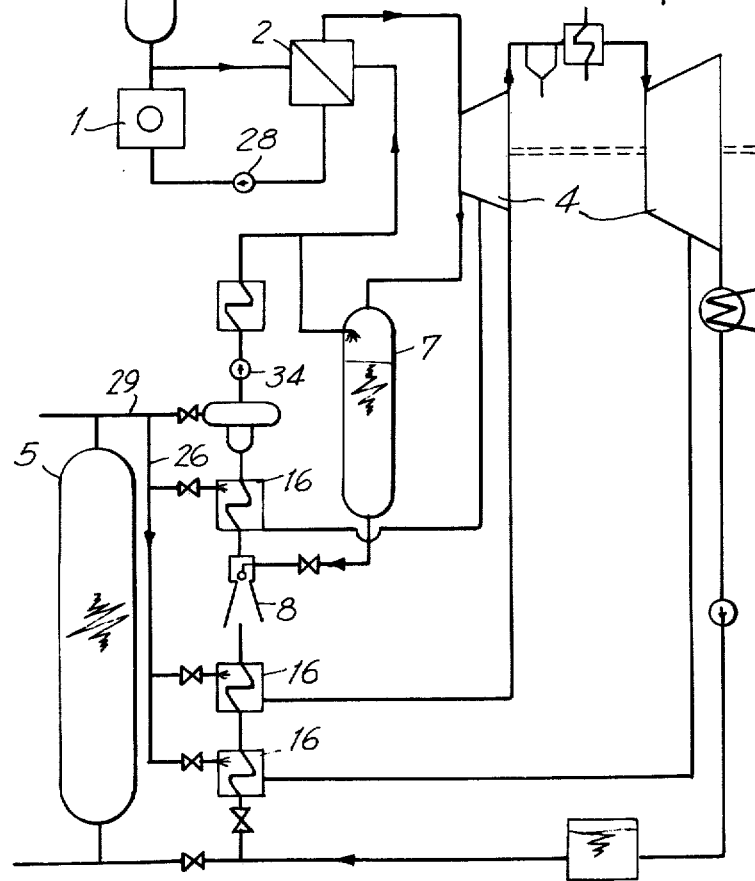
FIG. 5 is a schematic illustration of a further embodiment of a thermal power plant of the invention, this latter plant operating with primary turbines which can be overloaded.

FIG. 5 shows an embodiment of the invention where the additional peak power is achieved by overloading the low-pressure portion of the primary turbine 4 in two stages. The first stage of the overloading is brought about by shutting off the series of feedwater preheaters 16, with the bleeding of steam first being terminated and the feedwater being derived from the displacement accumulator means 5. When greater peak load requirements are encountered, in order to achieve the second stage of overloading the drive accumulator means 7 is set into operation with the ejector 8 and additional hot water is driven in a reverse direction through the series of feedwater preheaters 16, with water which is injected into the preheaters of the series of heat exchanger units 16 by the conduit 26 being converted into steam and delivered to the low pressure section of the primary turbine 4. Thus, in this embodiment the primary circuit means of the energy circuit is superimposed on the accumulator circuit means. A pressurized water reactor may serve as the reactor 1 with the pressure tank 27 and circulating pump 28 as well as the steam generator 2 being provided as illustrated. However, the circuit is also suitable for other types of reactors, with only minor changes being required in the primary circuit of the circulation path for the reactor cooling fluid.

The invention is suitable for use with plants having separate peak load turbines (FIGS. 1–3) as well as for plants where accumulator installations operate with overloading of the primary turbine, or a combination base load-peak load turbine (FIG. 5). The essence of the invention resides in the fact that the energy required for circulating the fluid of the displacement accumulators (constant-pressure accumulators) is derived from a driving accumulator in the form of a high-pressure accumulator. Preferably liquid is taken from the drive accumulator means so that it may be considered also almost as a constant-pressure accumulator with respect to the pressure relationships. In the drive accumulator means only an extremely small part of the liquid forming its total liquid content is vaporized to enlarge the steam chamber. At the end of the discharge the drive accumulator means is filled with steam which is almost at the initial pressure. Moreover, with the drive accumulator means circulation does not take place as with the displacement accumulator means, but instead almost the entire content of the drive accumulator means is removed and utilized for circulation in the primary or displacement accumulator circuit.

What is claimed is:

1. In a thermal power plant, such as a nuclear power plant, primary circuit means for generating primary power and accumulator circuit means communicating with said primary circuit means for generating additional peak power to be used in addition to the primary power during peak power periods, said accumulator circuit means including a displacement accumulator means for accumulating a reserve of energy during non-peak periods, steam generator means communicating with said displacement accumulator means for generating steam with fluid circulated between said displacement accumulator means and said steam generator means, circulating conduit means communicating with said displacement accumulator means and said steam generator means for circulating the fluid between said steam generator means and said displacement accumulator means, circulating means operatively connected with said circulating conduit means for circulating fluid therethrough, and drive accumulator means operatively connected with said circulating means for driving the latter.

2. The combination of claim 1 and wherein said circulating means includes at least one ejector.

3. The combination of claim 1 and wherein said circulating means includes at least one turbine-pump unit.

4. The combination of claim 1 and wherein a discharge conduit provides communication between said drive accumulator means and said circulating means, and superheating means communicating on the one hand with said discharge conduit to receive heat therefrom and on the other hand with said steam generator means for superheating steam received from said steam generating means.

5. The combination of claim 1 and wherein said circulating conduit means includes a discharge conduit extending from said displacement accumulator means to said steam generator means, and said steam generator means including a plurality of steam generator units connected in series with a first one of said units communicating directly with said discharge conduit, the second of said units communicating with the first, and so on.

6. The combination of claim 5 and wherein a feedwater supply means communicates with said steam generator units for supplying to the latter water from which steam is generated, said feedwater supply means communicating with said circulating conduit means for utilizing liquid circulated through said displacement accumulator means as feedwater for said plurality of steam generator means.

7. The combination of claim 6 and wherein said circulating means is operatively connected with said circulating conduit means between a pair of said steam generator units, and said feedwater supply means communicating with said circulating conduit means upstream of said circulating means and delivering feedwater therefrom to a steam generator unit situated downstream of said circulating means, said feedwater supply means including a throttle means for throttling the flow of feedwater to the unit which is situated downstream of said circulating means.

8. The combination of claim 6 and wherein said circulating conduit means communicates with said plurality of steam generator units for circulating fluid successively therethrough, and said feedwater supply means communicating with said circulating conduit means at a location downstream of the first of said steam generator units.

9. The combination of claim 5 and wherein a preheating means communicates with said circulating conduit means for deriving heat from at least part of the fluid flowing therethrough, and said feedwater supply means also communicating with said preheating means for preheating the feedwater before the latter is supplied to the steam generator units with the heat derived from the fluid flowing through said circulating conduit means.

10. The combination of claim 1 and wherein said steam generator means includes a plurality of flash steam generator units connected in series along said circulating conduit means and a plurality of phase-separating means respectively communicating with said flash steam generator units for separating the generated steam from the liquid.

11. The combination of claim 10 and wherein the series of flash steam generator units include at least one tapered conduit portion for accelerating tne flow of fluid, at least one phase-separating conduit portion, at least one ejector forming part of said circulating means and circulating the fluid through the series of flash steam generators, and at least one diffusor operatively connected with the last of the series of flash steam generator means.

12. The combination of claim 1 and wherein a feedwater preheating means for preheating the charge of said displacement accumulator means also serves as said steam generator means, control means operatively connected to said circulating conduit means for switching said feedwater preheating means between operations as feedwater preheater and steam generator, and said feedwater preheating means preheating feedwater supplied to said displacement accumulator means.

13. The combination of claim 12 and wherein said primary circuit means includes a turbine and said feedwater preheating means being operatively connected with said turbine when functioning as steam generator for overloading the latter turbine in order to achieve additional peak power.

14. The combination of claim 13 and wherein said turbine includes primary and secondary stages and said feedwater preheating means including units communicating with both of said stages for overloading the latter.

* * * * *